Sept. 19, 1939.      R. P. LANSING ET AL      2,173,757
MOTOR CONTROL SYSTEM
Original Filed April 6, 1937
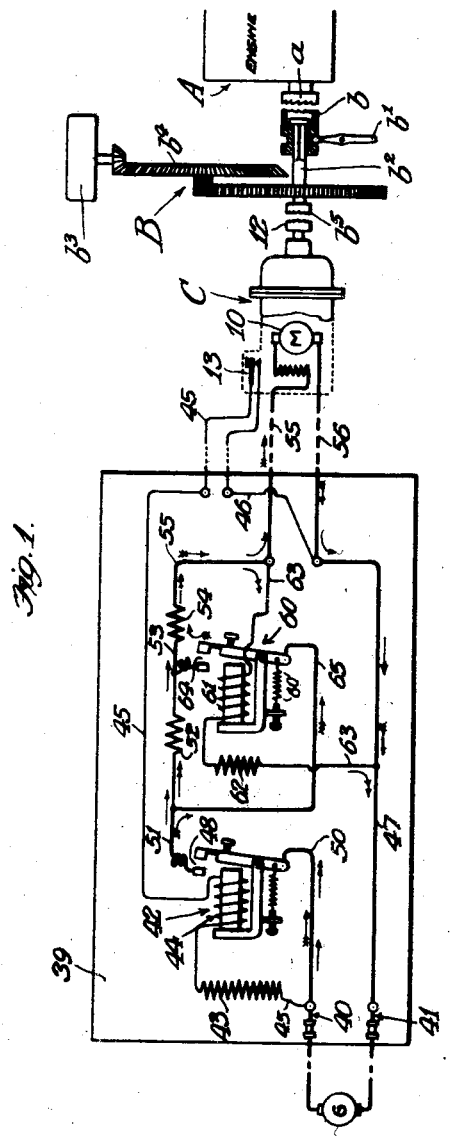
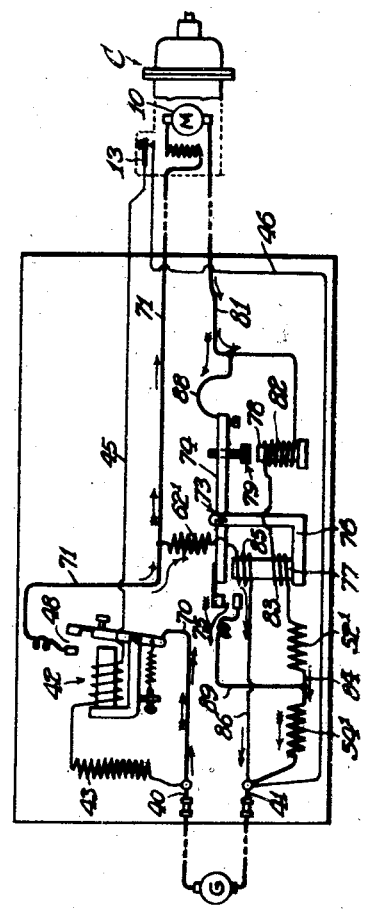
INVENTORS.
Raymond P. Lansing
George J. Hausamann
BY
Martin J. Finnegan
ATTORNEY.

Patented Sept. 19, 1939

2,173,757

UNITED STATES PATENT OFFICE 2,173,757

MOTOR CONTROL SYSTEM

Raymond P. Lansing, Montclair, and George J. Hausamann, Bloomfield, N. J., assignors to Eclipse Machine Company, Elmira, N. Y., a corporation of New York Original application April 6, 1937, Serial No. 135,312. Divided and this application September 21, 1937, Serial No. 164,958

10 Claims. (Cl. 172—288)

This invention relates to starting mechanisms for internal combustion engines, and more particularly to mechanism for use in starting aircraft engines.

For starting internal combustion engines, and particularly aircraft engines, inertia starters are used. In these, an inertia mass such as a flywheel is set in very rapid rotation, say of the order of 20,000 R. P. M., and then is connected with a member of the engine to be started, properly to apply the kinetic energy of the flywheel to cranking the engine. Speed-changing gearing of high order of reduction is interposed between the flywheel and that driving member of the starter which is to be engaged with the engine to crank it and commonly the starter is hand-operable, either as the sole manner of accelerating the flywheel or supplementally to the provision of an electric starting motor, the hand-cranking shaft being usually operatively connected with a low speed member of the reduction gearing in a position accessible exteriorly of the fuselage of the aircraft.

A primary purpose of the present invention is to provide desirable and effective means for accelerating inertia starters by power taken from an outside source of electrical supply, thus to avoid necessity for hand-cranking, or the use of the air-craft's storage battery for starting purposes where the starter is of the motor-powered type.

Further objects of the invention are to provide a motor-unit of the accelerator equipment in the convenient form of a hand-tool which will be of simple, effective and durable construction, and to combine with such motor-unit such electrical control-equipment as will both safeguard the motor and insure its effective operation to deliver proper initial torque to, and effect sustained acceleration of, the starter for promptly, safely and sufficiently bringing its flywheel speed up to the desired maximum.

Other objects sought, and attained by this invention, will hereinafter become apparent; and in the accompanying drawing is illustrated constructions and arrangements for embodiment of the invention which have been found in practice to be successful in the stated service.

In the drawing:

Fig. 1 is a diagrammatic view showing, in associated relationship, a motor-unit in the portable form of a hand-tool; control devices for assembly as a control unit flexibly connected with the motor-unit; and an inertia starter, schematically illustrated; and Fig. 2 is a diagrammatic view of modified control devices associated with the motor-unit.

Referring to Fig. 1, A indicates, fragmentarily, an internal combustion engine the crank shaft of which is accessibly provided with a clutch member $a$ to be cranked, and B indicates, by diagram of some of its major parts, an inertia starter for the engine; parts throughout the diagrammatic views being shown schematically without regard to physical proportioning thereof or details of commercial construction. In the starter, $b$ is a driving member shiftable longitudinally, as by shipper $b^1$, on the starter shaft $b^2$ to engage the engine member $a$ and rotatable with the non-circular end of such shaft to crank the engine. The inertia means or flywheel $b^3$ is operatively connected by any suitable reduction gearing $b^4$, of high order of reduction, with said shaft $b^2$, which is here shown as being also the hand-cranking shaft and as being provided accessibly with a positive clutch member $b^5$ to receive a complemental part of the motor-unit C of the accelerator-equipment.

It will be appreciated that the characteristics of an inertia starter as typified by the diagram thereof are such that exceedingly great torque can be instantaneously delivered to the starter at rest, especially where power is applied to the hand-cranking member $b^5$ at the low-speed end of the speed-changing gearing. We deem it highly desirable to guard against occurrence of this and, in order best to accelerate the starter, we so provide that an adequate but safely-limited torque shall first be applied to rotate the starter shaft through its lower range of speed, but that the energy supplied to the motor shall automatically be increased and torque consequently maintained, as the speed of the starter shaft increases.

As herein shown, the motor-unit C provides a motor 10 which is connected through reduction gearing 11 with the connector-member 12 that is to be engaged with part $b^5$ of the starter, thus to gear down the external starting motor 10 and insure that an initial, limited energization of the motor, harmless to such motor, will develop adequate torque to set the starter in rotation and drive its flywheel through the lower range of its acceleration.

The D. C. motor 10, here shown, is series wound, and is associated with electrical control equipment, presently to be described, whereby its initially-established circuit includes adequate safeguarding resistance, but whereby such resistance is automatically diminished in predetermined fashion for safely and quickly bringing the motor and consequently the starter up to the desired maximum speed; the starting and stopping of the motor being manually controlled by a hand-switch 13 mounted on the motor-unit.

Referring to the control devices diagrammed in Fig. 1, these may be mounted in a suitable panel box 39, with terminals to be flexibly connected to the hand-tool by wiring cords or cables, and of course the control box may itself be portable or fixed according to the power line conveniences of the "motor ship" or land air-port. Line wires lead into the box at 40 and 41, and electrical connection thereof with the motor is controlled from hand-switch 13 through the intermediacy of a line contactor or relay 42. The hand-switch circuit, established by closure of switch 13 includes a suitably high resistance element 43 and the magnet-coil 44 of the line contactor in a wire 45 connecting line wire 40 with one terminal of switch 13, its other terminal having connection by wires 46 and 47 with the line wire 41. Closure of the armature contacts 48 of contactor 42 establishes a circuit for motor 10 including a suitable plurality of steps of resistance for adequately limiting initial current supply to the motor. The motor circuit thus established is that indicated by featherless arrows and includes wire 50, contactor switch 48, wire 51, resistance step 52, wire 53, resistance element 54, wire 55 (leading to the motor) and return wire 56 connected via wire 47 to line wire 41.

Automatic control means, operatively responsive to development of counter electro-motive force in the motor consistent with predetermined motor speed, are provided for step-reduction of the line resistance, thereby to enable sufficient energy to be supplied to the motor to bring its speed up to useful, maximum rate. Specifically 60 indicates a relay structure, similar to contactor 42, having its coil 61 and a resistance element 62 bridged, by wire 63, across wires 55 and 47, in direct parallel with the motor 10, the resistance element 62 being of considerably lower ohmic resistance than the resistance element 43 in the hand-switch circuit. The resistance elements, such as, are shown as being, but need not necessarily be, non-inductive resistances.

When the motor 10 has reached a speed sufficiently increasing its counter electro-motive force to cause adequate current flow through the path indicated by double-headed arrows (i. e., via connections 40, 50, 48, 51, 52, 53, 54, 55, 63, 61, 62, 47, 41) the armature of the step contactor 60 will be attracted against the tension of its adjustable spring 60', and armature switch 64 closed. This armature switch 64 of relay 60 is connected by wire 65 to wires 51 and 53 so that when closed it shunts out the step resistance element 52, establishing the motor circuit (indicated by feathered arrows) via connections 40, 50, 48, 65, 64, 53, 54, 55, 10, 56, 47, 41.

Provision might kindredly be made for further cutting out of resistance elements by additional relays successively responsive to increased diversion of current through relay circuits bridging the motor terminals, by virtue of increasing the counter electro-motive force developed by the motor 10, but we have found in practice that the cutting out of a single, suitably-proportioned step of line resistance is sufficient for practical utility, and that one of the plural steps of line resistance may beneficially be left in service and proportioned to limit the top speed of the motor to a safe but adequate maximum.

It will be apparent that the motor can run only so long as the hand-switch 13 is kept closed, and the resistance of the element 43, greater than the combined resistances 52, 54 and 62, safely limits the flow of current through contactor coil 42. Blow-out coils, features of adjustment, etc. appropriate for the relays and of customary employment with relay switches are shown but need no specific description.

In Fig. 2 a modified control apparatus is shown, serving similar purposes. Its hand-switch circuit and the contactor associated therewith may be substantially identical in effect with those heretofore shown in Fig. 1. Thus switch 48 for contactor 42 is shown as connecting the wires 70 and 71 leading directly to one terminal of the motor, and the other motor-terminal has normal connections with the line wire 41 through two steps of resistance 52' and 54' for limiting the current initially supplied to the motor. In this modified arrangement a lock-out contactor 73 is employed, having its armature 74 gravity-biased to normally open the armature switch 75, closure of which will cut resistance element 52' out of the motor circuit. Two electro-magnets coact with the armature, one tending to close the switch 75, the other to open it. The one magnet has an "iron" magnetic circuit including the switch-closing end of the armature and the frame of the magnet and this magnet tends when energized to close said switch. The other electromagnet, coacting with the switch-opening end of the armature, has a magnetic circuit including a substantial air path and it tends when energized to hold open the switch 75. The coils of these magnets are connected with the motor-circuit so that the first-mentioned magnet will preponderate in effect and close the switch 75 only when the counter-electromotive force of the motor 10 has reached a predetermined value, and a holding coil is provided to retain the switch closed.

Thus, in the construction shown, the iron frame 76 carries a magnet core 77 to act on the switch-closing end of the armature 74, while a separate magnet core 78, magnetically separated from frame 76, coacts with an adjustable keeper or shoe 79 threaded in the tail of the armature. The return-lead 81 from motor 10 includes the respective coils 82 and 83 of cores 78 and 77 and the connection extends thence through resistance 52', wire 84, and resistance 54' to wire 41. A holding coil 85, for locking effect, is associated with the core 77, such coil, together with a suitably high resistance 62', being arranged in a connection 86 bridging between wires 71 and 41. The armature switch 75 controls a short circuiting connection around the coils 82 and 83 and the resistance 52', the tail of the magnet having a connection 88 to the motor return-lead 81 and the stationary switch-contact having connection 89 to the wire 84.

Closure of the line-contactor switch 48 (pursuant to the operator's closure of hand switch 13) establishes a circuit for the motor and energizes all of the coils of the lock-out relay 73. The motor circuit initially established is indicated by featherless arrows, via connections 40, 70, 48, 71, 10, 81, 82, 83, 52', 84, 54', 41; the holding coil 85, together with the high resistance element 62', being energized per the connections indicated by double-headed arrows.

In accordance with operating principles familiar in lock-out relays, the heavy initial current flow through the motor circuit gives the switch-opening magnet 78 preponderating effect and resistance 52' remains in the motor circuit, but as the counter-electromotive force of motor 10 builds up the pull of the "iron circuit" magnet 77 decreases less than does that of "air circuit" magnet 78 until, at the motor-speed for which the lock-out structure is adjusted, the pull of magnet 77 preponderates and switch 75 is thereby closed. This results in cutting the resistance element 52' out of the motor circuit, with an effect substantially as heretofore described in connection with Fig. 1. The closed condition of switch 75 will be maintained until line contactor switch 48 is opened, since holding coil 85 sufficiently energizes magnet 77 to maintain the armature 74 attracted to switch-closing position.

Thus it will be apparent that the lock-out structure 73 may be caused to automatically cut out the step 52' of the initial resistance when the counter-electromotive force of the motor is built up consistently with a selected speed thereof, without reliance on spring resistance to armature movement such as depended on in the construction shown in Fig. 1.

While a particular embodiment of the invention has been shown and described in considerable detail, it will be understood that changes may be made therein without departure from the spirit of the invention or from the scope of the appended claims.

This application is a division of co-pending application No. 135,312, filed April 6, 1937, which is in turn a division of our earlier application No. 309,286 filed September 29, 1928, and abandoned after the filing of the substitute application No. 135,312 above identified.

What is claimed is:

1. The combination with an electric motor of a hand-switch for starting and stopping the motor, connections controlled thereby for establishing an initial circuit for the motor including resistance-means to limit energization of the motor in its lower range of speed, and electro-responsive means, connected to be operably affected by counterelectromotive force of the motor within its lower speed-range, for automatically cutting said resistance means out of the motor circuit, said means including a lock-out contactor in said circuit, and electromagnetic means of oppositely varying force acting oppositely thereon.

2. The combination with an electric motor of a hand-switch for starting and stopping the motor, and control equipment connected with said motor and switch, including resistance means, a relay controlled by said switch for establishing an initial circuit for said motor through said resistance means to limit energization of the motor in its lower range of speed, and electro-responsive means, connected to be operatively affected by electro-motive force of the motor developed within its lower speed range, for automatically establishing a circuit for said motor excluding said resistance means, said means including a lock-out contactor in sa'd circuit, and electromagnetic means of oppositely varying force acting oppositely thereon.

3. The combination with an electric motor of a hand-switch for starting and stopping the motor, combined with control means connected with said motor and switch and including resistance means, a line-contactor relay, a cut-out relay and connections for establishing a h'gh resistance circuit for the line contactor magnet controlled by said hand switch, an initial circuit for the motor controlled by the armature of the line contactor and including said resistance means, a shunt for the motor including a winding of said cut-out relay and adapted to effectively energize the same by virtue of counter-electromotive force of the motor developed in its lower speed range, and connections controlled by the armature of said cut-out relay for establishing a motor circuit excluding said resistance means, said means including a lock-out contactor in said circuit, and electromagnetic means of oppositely varying force acting oppositely thereon.

4. The combination with an electric motor of an electric hand-switch for starting and stopping the motor, connections controlled thereby for establishing an initial circuit for the motor including resistance-means to limit energization of the motor in its lower range of speed, and electro-responsive means, connected to be operably affected by counterelectromotive force of the motor within its lower speed-range, for automatically cutting said resistance means out of the motor circuit, said means including a lock-out contactor in said circuit, and electromagnetic means of oppositely varying force acting oppositely thereon.

5. The combination with an electric motor of an electric hand-switch for starting and stopping the motor, and control equipment, connected with said motor and switch, including resistance means, a relay controlled by said switch for establishing an initial circuit for said motor through said resistance means to limit energization of the motor in its lower range of speed, and electroresponsive means, connected to be operatively affected by electro-motive force of the motor developed within its lower speed range, for automatically establishing a circuit for said motor excluding said resistance means, said means including a lock-out contactor in said circuit, and electromagnetic means of oppositely varying force acting oppositely thereon.

6. The combination with a series-wound motor, of an electric hand-switch for starting and stopping the motor, control means connected with said motor and switch and including resistance means, a line-contactor relay, a cut-out relay and connections for establishing a high resistance circuit for the line contactor magnet controlled by said hand switch on said tool, an initial circuit for the motor controlled by the armature of the line contactor and including said resistance means, a shunt for the motor including a winding of said cut-out relay and adapted to effectively energize the same by virtue of counter electro-motive force of the motor developed in its lower speed range, and connections controlled by the armature of said cut-out relay for establishing a motor circuit excluding said resistance means, said means including a lock-out contactor in said circuit, and electromagnetic means of oppositely varying force acting oppositely thereon.

7. The combination with an electric motor of connections for establishing an initial circuit for the motor including resistance-means to limit energization of the motor in its lower range of speed, and electro-responsive means, connected to be operably affected by counter electromotive force of the motor within its lower speed-range, for automatically cutting said resistance means out of the motor circuit, said means including a lock-out contactor in said circuit, and electromagnetic means of opposite-varying force acting oppositely thereon.

8. The combination with an electric motor of connections for establishing an initial circuit for the motor including means to limit energization of the motor in its lower range of speed, and electro-responsive means, connected to be operably affected by counter electromotiveo force of the motor within its lower speed-range, for automatically cutting said limiting means out of the motor circuit, said means including a lock-out contactor in said circuit, and electromagnetic means of oppositely varying force acting oppositely thereon.

9. The combination with an electric motor of connections for establishing an initial circuit for the motor including means to limit energization of the motor in its lower range of speed, and electro-responsive means, connected to be operably affected within the lower speed range of the motor, for automatically cutting said limiting means out of the motor circuit, said means including a lock-out contactor in said circuit, and electromagnetic means of oppositely-varying force acting oppositely thereon.

10. The combination with an electric motor of connections for establishing an initial circuit for the motor including means to limit energization of the motor in its lower range of speed, and electro-responsive means, connected to be operably affected within the lower speed range of the motor, for automatically establishing a circuit for said motor in shunt relationship to said limiting means, said means including a lock-out contactor in said circuit, and electromagnetic means of oppositely varying force acting oppositely thereon.

RAYMOND P. LANSING.
GEORGE J. HAUSAMANN.